H. STUEBNER.
ANTIFRICTION BEARING.
APPLICATION FILED JAN. 24, 1911.
1,068,017.
Patented July 22, 1913.
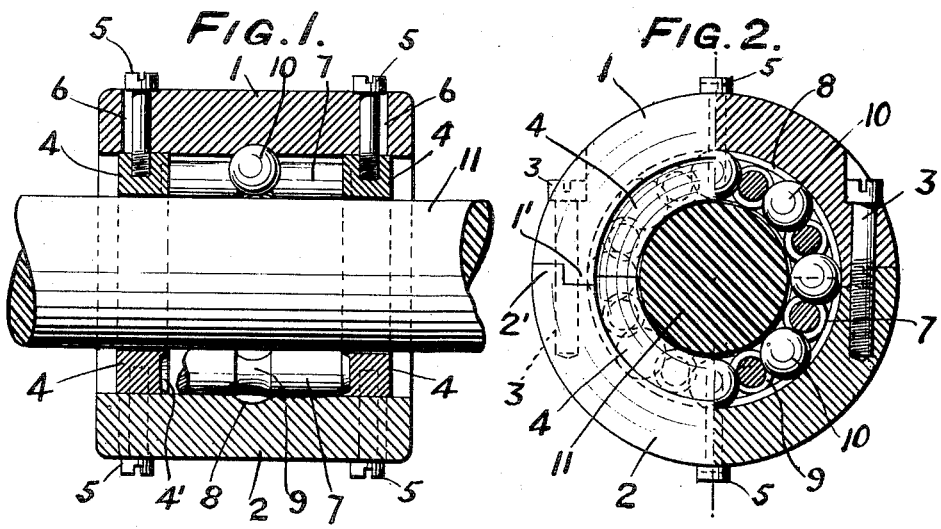
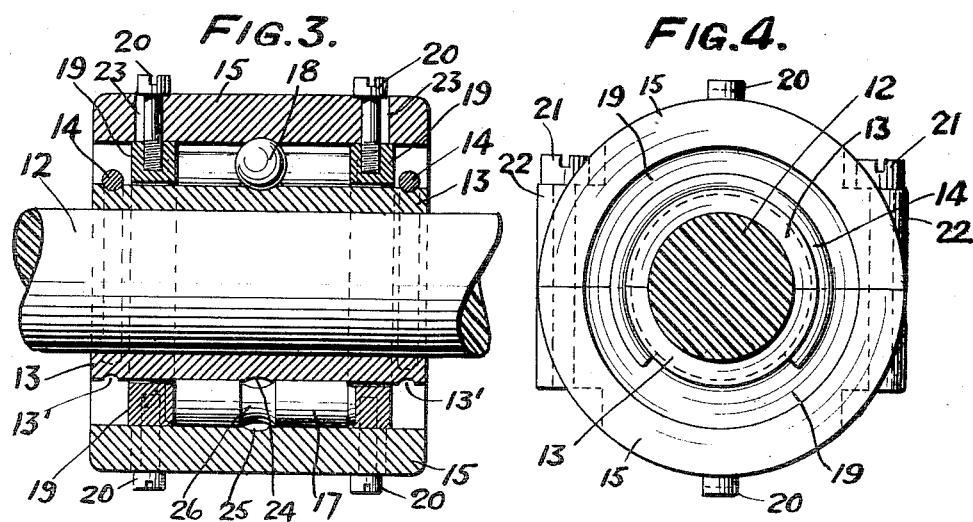
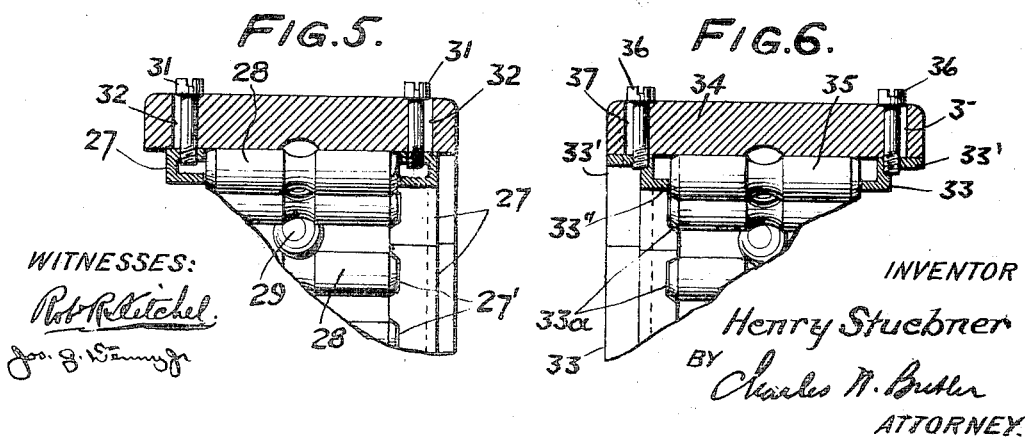
WITNESSES:
INVENTOR
Henry Stuebner
BY
Charles N. Butler
ATTORNEY.

UNITED STATES PATENT OFFICE.

HENRY STUEBNER, OF PHILADELPHIA, PENNSYLVANIA.

ANTIFRICTION-BEARING.

1,068,017. Specification of Letters Patent. Patented July 22, 1913.

Application filed January 24, 1911. Serial No. 604,298.

*To all whom it may concern:*

Be it known that I, HENRY STUEBNER, a citizen of the United States, residing in the city of Philadelphia, county of Philadelphia, and State of Pennsylvania, have invented certain Improvements in Antifriction-Bearings, of which the following is a specification.

My invention is an improved antifriction bearing comprising a sectional journal box having means for holding its parts together, in combination with balls and rollers related so that one set of devices act as spacers for the other, and means whereby the balls and rollers are held in the separated box sections.

The characteristic features of my improvements are more fully disclosed in the following description and the accompanying drawings in illustration thereof.

In the drawings, Figure 1 is a longitudinal sectional view of a form of my improved bearing applied to a shaft; Fig. 2 is a transverse sectional view of the construction illustrated in Fig. 1; Fig. 3 is a longitudinal sectional view of a second form of bearing embodying my invention; Fig. 4 is an end view of the bearing illustrated in Fig. 3; Fig. 5 is a broken longitudinal section of a third form of bearing embodying my improvements; and Fig. 6 is a broken longitudinal section of a fourth form of bearing embodying the invention.

The bearing, as illustrated in Figs. 1 and 2, comprises a box composed of the sections 1 and 2 having the interlocking longitudinal flanges or ribs 1' and 2' for holding them against lateral movement, the sections being fixed together in their operative position by screws 3 set therein. Sectional rings 4 fit within the ends of the semi-cylindrical bearing surfaces of the respective box sections where they are held by screws 5 which pass through slots 6 in the box sections, whereby the ring sections are adapted to be moved parallel to their axis. The rings are provided with sockets 4' adapted for engaging the ends of rollers 7 and holding them within the box sections, upon the inner cylindrical surface of which they are designed to roll. The box sections are provided with circular races 8 and the rollers are provided with the circular races 9, in which races balls 10 are engaged. These balls space the rollers, are held in position thereby, and hold the rollers against endwise movement. The separated box sections 1 and 2, with the balls 10 and rollers 7 held therein by the engagement of the ring sections 4 with the latter, can be coupled upon the shaft 11 by engaging the flanges 1' and 2' and inserting the screws 3. The bearing being thus conveniently placed upon any intermediate section of the shaft, the rings are shifted out of engagement with the rollers, by loosening the screws 5, and held out of engagement by setting the screws.

As illustrated in Figs. 3 and 4, the shaft 12 has applied thereto a bearing collar or sleeve comprising the cylindrical sections 13 having on the ends thereof the circular channels 13', the sections being clamped on the shaft by springing the open rings or ring sections 14 into the channels. The box sections 15, with the corresponding rollers 17 and balls 18 engaged within them by the ring sections 19 and screws 20, are then placed on the collar and fixed together by screws 21 which pass through lugs 22 on the box sections. The parts being thus assembled, the screws 20 are loosened and the rings 19 are moved out of engagement with the rollers 17, where they are held by resetting the screws, slots 23 being provided in the box to permit the movement of the screws longitudinally of the rollers. The balls are engaged in the concentric races 24 and 25 of the collar and box and engage the races 26 of the rollers, whereby the balls and rollers are held in the desired relation.

In Fig. 5, there is illustrated a modified form of ring comprising the pressed metal sections 27 having sockets in the form of notches 27' therein for engaging the ends of the rollers 28, which are spaced by and hold the balls 29, the rings being produced conveniently by pressing sheet metal into the form of a circular channel. These channels are engaged in adjustable relation to the box sections 30 by the screws 31 which pass through the slots 32 in the boxes.

Fig. 6 illustrates a further form of ring comprising complementary pressed metal parts 33 of Z-shaped cross section, having legs 33' bearing on the cylindrical interior surface of the box sections 34 and the legs 33'' provided with the sockets or notches 33ª adapted for engaging the ends of the rollers 35 which bear upon such surface, the legs 33'¦ being engaged by screws 36 which pass through the slots 37 in the box whereby the rings can be shifted into or out of engagement with the rollers.

It will be understood that to avoid grinding action between the balls and rollers, whether the balls or the rollers be used as spacers, such spacers will be relieved of the load, by reducing their diameters sufficiently, while the other will carry the load.

Having described my invention, I claim:

1. An antifriction bearing comprising a journal box having a race, rollers having races registering with said races first named, balls disposed between said rollers in said races, rings adjustable in said box, said rings having sockets adapted for engaging the ends of said rollers to lock them to said box, and screws adjustable in said box whereby said rings are held in several positions.

2. An antifriction bearing comprising a journal box containing a race, alternating balls and rollers containing races, said balls acting in the races of said box and rollers, an adjustable ring having a leg adapted to engage said box and a leg adapted to engage said rollers, and means for holding said ring in said box in and out of engagement with said rollers.

3. An antifriction bearing comprising a sectional journal box, means for fixing said sections together, a sectional ring of pressed metal having a leg adapted to engage said box and a notched leg adapted to engage the ends of said rollers, and means for connecting said ring to said box in and out of engagement with said rollers.

4. An antifriction bearing comprising a sectional journal box, rollers disposed in said box, sectional rings, and means whereby sections of said rings are engaged to and movable relatively to corresponding sections of said box, said sections being adapted for engaging said rollers to and permitting their disengagement from sections of said box.

5. An antifriction bearing comprising a sectional journal box having a race therein, means for holding said sections together, a sectional collar, open rings adapted to be sprung on the ends of said collar to hold the sections thereof together, alternating balls and rollers between said collar and box, said balls being engaged in said race and holding said rollers against endwise movement, and adjustable rings which in one position thereof lock said rollers and in another position thereof permit movement of said rollers.

6. An antifriction bearing comprising a box, a collar, one of said parts having a circular race therein, alternating balls and rollers disposed between said box and collar, said rollers having circular races therein and said balls being engaged in said races, and adjustable rings movable into and out of engagement with the ends of said rollers.

7. An antifriction bearing comprising a sectional box having a circular race therein, alternating balls and rollers in said box, said rollers having circular races therein and said balls being engaged in said races, and rings adjustable in said box into and out of engagement with said rollers.

In witness whereof I have hereunto set my name this 19th day of January, 1911, in the presence of the subscribing witnesses.

HENRY STUEBNER.

Witnesses:
  Jos. G. Denny, Jr.,
  C. N. Butler.